US008903586B2

(12) United States Patent
McVean

(10) Patent No.: US 8,903,586 B2
(45) Date of Patent: Dec. 2, 2014

(54) ELECTRIC VEHICLE POWER REGULATING CONTROL METHOD WITH MANUAL-ASSIST HYBRID MODES

(71) Applicant: Aerobic Cruiser Hybrid Cycles, LLC, Memphis, TN (US)

(72) Inventor: Charles McVean, Memphis, TN (US)

(73) Assignee: Aerobic Cruiser Hybrid Cycles, LLC, Memphis, TN (US)

( * ) Notice: Subject to any disclaimer, the term of this patent is extended or adjusted under 35 U.S.C. 154(b) by 0 days.

(21) Appl. No.: 14/153,713

(22) Filed: Jan. 13, 2014

(65) Prior Publication Data

US 2014/0129072 A1 May 8, 2014

Related U.S. Application Data

(62) Division of application No. 13/290,821, filed on Nov. 7, 2011, now abandoned.

(60) Provisional application No. 61/410,596, filed on Nov. 5, 2010.

(51) Int. Cl.
*B60L 9/00* (2006.01)
*B60L 15/20* (2006.01)
*B62M 6/45* (2010.01)
*B60W 10/08* (2006.01)
*B60W 20/00* (2006.01)

(52) U.S. Cl.
CPC ............. *B60L 15/20* (2013.01); *B60W 10/08* (2013.01); *B60W 20/00* (2013.01); *B60L 2240/12* (2013.01); *B62M 6/45* (2013.01); *Y02T 10/7258* (2013.01)
USPC .......................................................... 701/22

(58) Field of Classification Search
CPC ............................... B60W 20/00; B60W 10/08
USPC ............................................................. 701/22
See application file for complete search history.

(56) References Cited

U.S. PATENT DOCUMENTS

| 5,749,429 | A  | * | 5/1998  | Yamauchi et al. | ......... | 180/206.4 |
| 6,011,366 | A  | * | 1/2000  | Murakami et al. | ................ | 318/1 |
| 6,125,959 | A  | * | 10/2000 | Seto et al. | .................. | 180/206.2 |
| 6,163,148 | A  | * | 12/2000 | Takada et al. | ................ | 324/226 |
| 6,260,649 | B1 | * | 7/2001  | Carney, Jr. | ..................... | 180/220 |
| 6,483,272 | B1 | * | 11/2002 | Terada et al. | ................. | 320/103 |
| 6,555,928 | B1 | * | 4/2003  | Mizuno et al. | .............. | 290/40 C |

(Continued)

FOREIGN PATENT DOCUMENTS

WO    WO2011/019743 A1 *  2/2011  ............... B26M 6/40

OTHER PUBLICATIONS

Andreas Fuchs, "Series Hybrid Drive-System advantages for Velomobiles", all pages, Apr. 21, 2006.*

(Continued)

*Primary Examiner* — Calvin Cheung
(74) *Attorney, Agent, or Firm* — Butler Snow LLP

(57) ABSTRACT

We disclose a method for controlling power to a human electric hybrid vehicle that creates a superior ride compared to electric vehicles of the prior art. The present invention employs a large motor that can assist a rider at slower speeds but limits the amount of power that the motor can produce at greater speeds. We also disclose a controller and a human electric hybrid bicycle capable of utilizing the claimed method.

3 Claims, 3 Drawing Sheets

Power and Speed Flowchart

(56) References Cited

U.S. PATENT DOCUMENTS

| | | | |
|---|---|---|---|
| 7,185,726 B2* | 3/2007 | Young | 180/206.5 |
| 7,293,623 B2* | 11/2007 | Berkelmans | 280/250.1 |
| 2002/0014366 A1* | 2/2002 | Turner | 180/220 |
| 2004/0098185 A1* | 5/2004 | Wang | 701/70 |
| 2006/0037796 A1* | 2/2006 | Naegeli | 180/205 |
| 2008/0115995 A1* | 5/2008 | Holland | 180/216 |
| 2008/0156564 A1* | 7/2008 | Driessen | 180/220 |
| 2008/0200079 A1* | 8/2008 | Jansen | 440/1 |
| 2010/0170727 A1* | 7/2010 | Hsu et al. | 180/2.2 |
| 2011/0266082 A1* | 11/2011 | Yang | 180/206.5 |
| 2013/0260958 A1* | 10/2013 | Wang | 477/5 |

OTHER PUBLICATIONS

U.S. Appl. No. 13/290821 Non-Final Office Action, all pages, mailed out Jul. 11, 2013.*
Nica, K., "How Fuel Injection Systems Work", HowStuffWorks.com, all pages, Sep. 7, 2009.*
"Throttle", Wikipedia, all pages, Aug. 31, 2009.*
Pete Prebus, Understanding Electric Bike Modes: Throttle vs. Pedal Assist (Pedelec), Electricbikreport.com, published on or about May 8, 2013.

* cited by examiner

ELECTRIC VEHICLE POWER REGULATING CONTROL METHOD WITH MANUAL-ASSIST HYBRID MODES

CROSS-REFERENCES TO RELATED APPLICATIONS

This application is a division of application Ser. No. 13/290,821 filed Nov. 7, 2011. Application Ser. No. 13/290,821 claims the benefit of U.S. Provisional Application No. 61/410,596 by Charles McVean, filed Nov. 5, 2010, which is incorporated herein by reference in entirety.

FIELD OF THE INVENTION

The present invention is directed toward a method for regulating power in electric vehicles to allow manual assistance.

BACKGROUND OF THE INVENTION

Manually powered vehicles, such as bicycles, having electrically assisted motors are well-known in the prior art. However, due to regulations, the power that an electric motor on a bicycle may produce is limited. For example, in the United States, the Consumer Product Safety Commission requires that, in order to have an electric, two-wheeled vehicle classified as a bicycle in the U.S., the vehicle must have pedals and an electric motor of 750 watts or less. It also must not exceed 20 mph under motor power alone.

One way to satisfy the speed limitations would be to install a sufficiently small motor so that the vehicle would never have enough power to exceed 20 mph. This would technically comply with the regulations, but this would result in a very underpowered vehicle that would provide insufficient assistance when needed on locations such as hills.

Another way to comply with the regulations would be to install a large enough motor on the vehicle and speed sensors that would shut off the power to the motor when the 20 mph threshold is reached. This method would ensure that, under motor power alone, the vehicle would not exceed 20 mph. However, vehicles of this design would not assist the rider if the rider wished to exceed 20 mph by pedaling. Instead, the rider would suddenly have to rely solely on his own efforts when he hits this threshold speed.

SUMMARY OF THE INVENTION

We disclose herein a device and method for controlling power to a human electric hybrid vehicle that creates a superior ride compared to electric vehicles of the prior art. The present invention employs a large motor that can assist a rider at slower speeds, but limits the amount of power that the motor can produce at greater speeds.

It is an object of the invention to provide a method for controlling the power supplied to the motor of a human electric hybrid vehicle comprising detecting a throttle position, detecting the speed of the vehicle relative to a threshold speed wherein said speed is due to an electric motor and manual power, and determining the current to be supplied to the motor such that the motor provides no additional power beyond the power required to achieve said threshold speed.

It is a second object of the invention to provide a human electric hybrid vehicle having an electric drive system and a manual drive system and a controller that determines the power to be supplied to the electric motor such that the motor does not provide maximum power at speeds beyond a threshold speed.

BRIEF DESCRIPTION OF THE DRAWINGS

Further advantages of the invention will become apparent by reference to the detailed description of preferred embodiments when considered in conjunction with the drawings.

DETAILED DESCRIPTION

Figure 1:
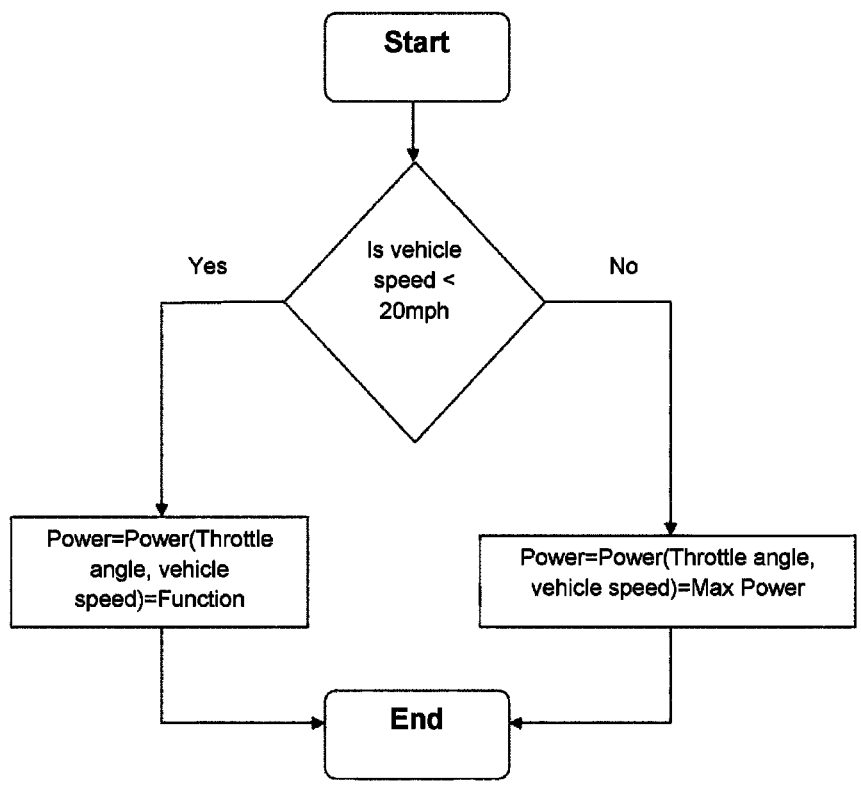
FIG. 1 is a Power and Speed Flowchart

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

We disclose herein a human electric hybrid vehicle that employs a large motor that can assist a rider at slower speeds but limits the amount of power that the motor can produce at speeds beyond a threshold speed. The method of determining the power supplied to the electric motor produces a superior ride compared to electric motor-assisted vehicles of the prior art. The present invention allows the rider to accelerate very rapidly, but allows an automatic gradual shift toward requiring more human power to achieve even greater speeds.

As used herein, human electric hybrid vehicles include vehicles that may be powered simultaneously by manual by human power or electrically. This class includes electrically assisted bicycles, tricycles, and wheelchairs. The disclosed method is employed by the drive and control system (DCS) of the human electric hybrid vehicle. The DCS allows the human electric hybrid vehicle to be powered by human means alone, by electric means alone or by a combination of human and electric means. The DCS seamlessly integrates the human power input and the electrical power input as automatically as possible, requiring little human intervention.

At speeds below a threshold speed, an electric motor is used to assist the rider. At speeds above the threshold speed, the motor continues to operate, but the amount of power the motor can produce just equals that required of the vehicle at the threshold speed. In this scheme, the 20 mph limit required by the Consumer Product Safety Commission is satisfied; however, the motor is sized such that it can still deliver a significant amount of power at speeds above 20 mph. The control system is designed so that, at speeds above 20 mph, the maximum amount of power that the motor is allowed to deliver is limited to the same amount of power that is delivered at 20 mph. This ensures that the motor alone cannot, at any time, power the vehicle above 20 mph. With the combination of pedaling and motor power, the motor will provide an assist to the rider, making it easier to exceed 20 mph.

The DCS consists of the following main systems: an electric drive system, a human drive system, and an operator interface.

The electric drive system encompasses the components associated with the electric means for driving the human electric hybrid vehicle. This includes a battery for providing the electric power, a drive motor for providing the means of propulsion, a motor driver for powering the motor, and a controller that provides the decision-making functions for controlling the motor and integrating the human and electric drive systems. In addition, the electric drive system incorporates the means of transmission of the drive motor power to the rear wheel, if required. The electric drive system will also provide the power and control to operate all of the auxiliary electronic devices, such as lights, horns, and interlocks.

The human drive system incorporates the means for the human drive input, such as pedals, and the means of human power transmission to the rear wheel. In addition, the human drive system includes the means of varying the ratio between the drive input and the rear wheel as required for efficient human operation.

The operator interface includes all of the input and output controls and displays used by the operator to interact with the human electric hybrid vehicle. These controls will operate on both the electric drive system components and the human drive system components, as well as displaying necessary information from both of these systems.

The DCS controls the amount of power that is supplied to the electric drive system based on signals from the throttle and the speed sensor. The flowchart depicted in FIG. 1 describes the decision making process of the controller upon receiving the signal from the throttle and the speed sensor at a set threshold speed. The decision involves one true/false assessment with two possible outcomes.

Figure 3:
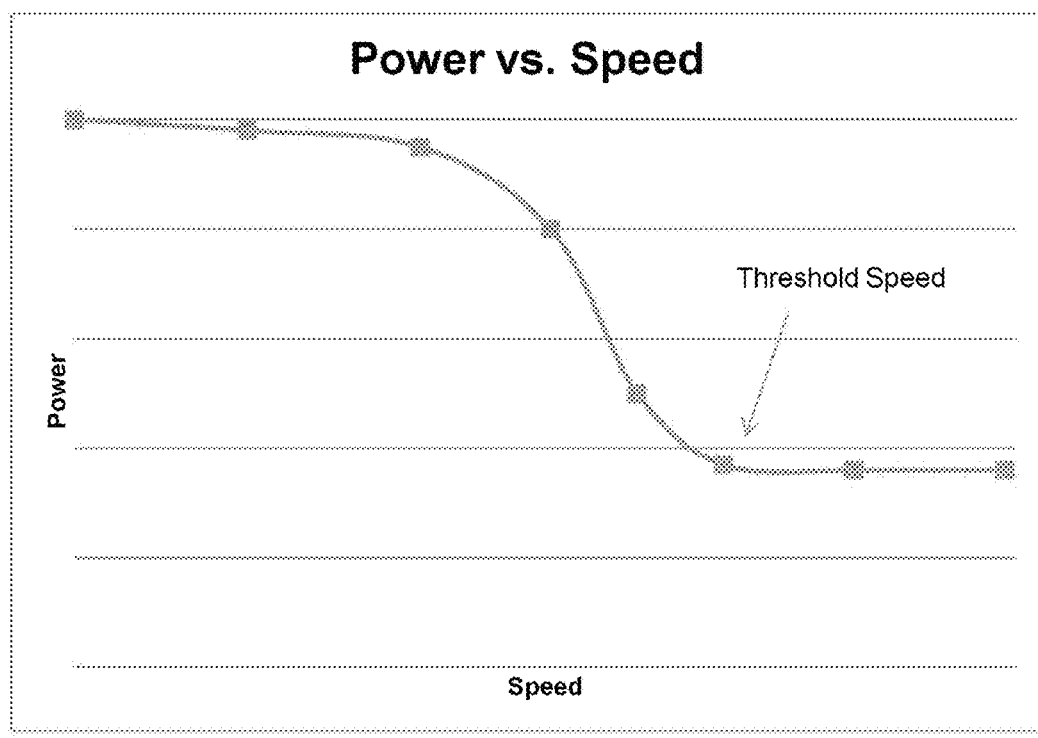
FIG. 3 is a graph of power supplied to the electric motor vs. speed.

The decision point is whether or not the vehicle speed is less than the threshold speed. For the example depicted in FIG. 1, the threshold speed is 20 miles per hour, however it is contemplated that any predetermined threshold speed may be used in the invention. In this example, if the vehicle speed is less than 20 miles per hour, the power sent to the wheel is a function of throttle angle and vehicle speed. The rider can adjust the throttle in such a way that alters the power supplied. At speeds less than the threshold speed, the controller decides how much current to supply to the motor at the current speed. An example function of power supplied versus speed used on a human electric hybrid vehicle can be seen in FIG. 3. It should be appreciated from this graph of power vs. speed that, as the speed of the human electric hybrid vehicle increases, the power to the electric motor decreases gradually in a smooth controlled reduction. This reduces the potential of sudden unexpected power drops that may be disconcerting to the rider.

If the vehicle speed is greater than the threshold speed, then the controller only allows the same amount of power to the motor as it does slightly below the threshold speed. For example, if the threshold speed is 20 miles per hour, then the controller only allows the same amount of power to the motor as it did at 19.9 mph. In this example, if the rider accelerates to a speed greater than 20 miles per hour by using his/her pedaling and then ceases to pedal while maintaining full throttle, the vehicle will decelerate down to just below 20 miles per hour.

Figure 2:
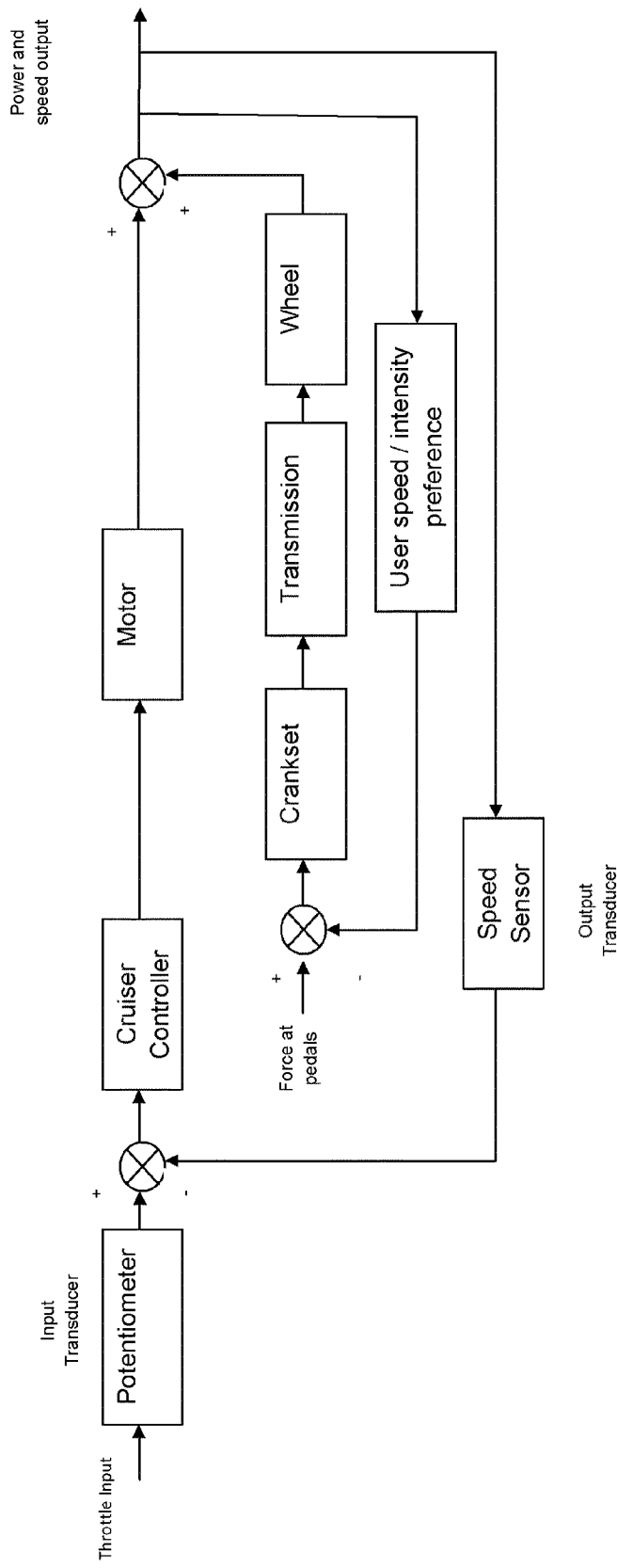
FIG. 2 is a functional Block Diagram of the Drive and Control System.

The human drive system and the electric drive system are integrated such that power and speed output of the human electric hybrid vehicle is a combination of the two systems. As will be appreciated from FIG. 2, the DCS continuously makes decisions about the appropriate amount of power that should be allocated to the motor.

The drive system is a dual input single output system. The two inputs are the displacement of the throttle, which is associated with the electric drive system, and the force at the pedals, which is associated with the traditional mechanical drive of a traditional bicycle (the human drive system).

In the electric drive system, the angular input (displacement) of the throttle inducts a voltage proportional to the angle. This signal is sent to the controller, which acts as the control process of the drive. The controller decides, based on the angular displacement, how much current to send to the motor at a particular voltage. This results in a unique speed and power at the wheel.

A speed sensor measures the speed of the vehicle, preferably through monitoring the speed of the wheel. The results of the speed sensor are used in the feedback function. The signal obtained from the speed sensor is then summed negatively with the signal from the potentiometer. Their difference is the error (or actuating signal) which is sent to the controller. The controller then modifies the amount of current supplied from the battery at a particular voltage to the motor until the input and output are the same. These incremental changes result in the smooth application or reduction of power to the motor.

The human drive system provides the mechanical component of the human electric hybrid vehicle and is dependent upon the rider. In a preferred embodiment, the human operator drives the vehicle using a crank. The mating with the crank can either be performed with foot pedals or handles. This is then sent through a traditional drive system using gears and transmissions to meet the wheel. Unlike the electric drive, which uses a quantitative measuring apparatus to deliver a feedback signal into the controller, the feedback function of the mechanical side is completely dependent upon the rider's preferences. The rider adjusts his intensity based on the desired amount of force that he would like to use during operation. For example, when commuting, the rider may want to exert little energy, but, while exercising, he would find it beneficial to exert more energy.

The two power signals (from the electric drive system and the human drive system) are then summed (both positive) at the wheel. This is the single output to which the two inputs combine, resulting in increased speed of the vehicle.

The human electric hybrid vehicle may operate in an "Outdoor Exercise Machine" mode. In this mode, it will provide a controlled resistance to the operator input (pedals) and provide feedback to the operator in terms of the total amount of work expended and the rate of work (power) input by the operator at any time.

EXAMPLES

In one embodiment, the human electric hybrid vehicle is a bicycle having an electric motor and a threshold speed of 20 miles per hour. The bike is designed to be used for commuting, touring and recreation, and exercise. Each of the uses has its own special requirements that are satisfied by the same bike. For commuting, the hybrid bike must require very little effort to operate and must be capable of frequent starts and stops and high acceleration. For touring and recreation, the bike is capable of travelling long distances while carrying cargo. In this use, low to medium operator effort is anticipated. Finally, for exercise, it is anticipated that the bike would be used for long distances and higher operator effort. The operator would also require clear feedback on the amount of effort expended.

The bike has additional features beyond the disclosed invention to ensure that it can be used for the three different anticipated uses. In this embodiment, the bike is equipped with rechargeable batteries that supply power for the motor. It also can monitor the state of charge of battery and report it to the controller. The motor for this bike has a maximum continuous free air power rating of 750 watts and has sufficient power to allow 400 pounds of combined weight of the bike and rider to accelerate from standstill to 10 mph in three seconds using motor power alone and from standstill to 19.8 miles per hour in six seconds using motor power alone.

In this embodiment, the controller allows the throttle to deliver 0-900 W to the electric motor at speeds below 19.9 MPH, and 0 to 275 W at speeds of 20 MPH or higher. It allows higher power settings for hill climbing at lower speeds while optimizing energy efficiency at cruise speeds above 20 MPH. In this embodiment, the motor and controller limit the top speed to 19.9 miles per hour with motor power alone. The maximum speed with human power can be limited to 25 miles per hour with 125 watts of manual input.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A method for controlling power supplied to an electric motor of a manual electric hybrid vehicle comprising:
    detecting a throttle position of an electric drive system, wherein said detecting is performed by a drive and control system (DCS);
    detecting a speed of said manual electric hybrid vehicle relative to a threshold speed wherein said speed is due to said electric motor and a manual drive system,
        wherein said detecting is performed by said DCS and
        wherein said manual drive system comprises a crank, a chain, and at least one gear for transferring manual power mechanically from said crank to at least one wheel of said manual electric hybrid vehicle; and
    determining a current to be supplied to said electric motor such that said electric motor provides no additional power beyond that power required to achieve an electric-powered speed just below said threshold speed, wherein said determining is performed by said DCS.

2. The method of claim 1 further comprising a step of incrementally reducing power to said electric motor as said manual electric hybrid vehicle approaches said electric-powered speed just below said threshold speed.

3. A manual electric hybrid vehicle comprising:
    an electric drive system wherein said electric drive system comprises an electric motor;
    a manual drive system wherein said manual drive system comprises a mechanical system of a crank, a chain, and at least one gear configured to transfer manual power mechanically from said crank to at least one wheel of said manual electric hybrid vehicle; and
    drive and control system (DCS) wherein said DCS is configured to:
        detect a throttle position of said electric drive system,
        detect a speed of said manual electric hybrid vehicle relative to a threshold speed wherein said speed is due to said electric motor and said manual drive system, and
        determine a current to be supplied to said electric motor such that said electric motor provides no additional power beyond that power required to achieve an electric-powered speed just below said threshold speed.

* * * * *